(12) United States Patent
Abrams

(10) Patent No.: US 10,275,588 B2
(45) Date of Patent: Apr. 30, 2019

(54) PROVIDING MULTI-FACTOR SECURITY FOR ELECTRONIC DEVICES THROUGH BODY AREA NETWORK AND RADIOFREQUENCY NETWORK COMMUNICATIONS

(71) Applicant: CA, Inc., New York, NY (US)

(72) Inventor: Howard Abrams, San Mateo, CA (US)

(73) Assignee: CA, Inc., New York, NY (US)

( * ) Notice: Subject to any disclaimer, the term of this patent is extended or adjusted under 35 U.S.C. 154(b) by 264 days.

(21) Appl. No.: 15/064,448

(22) Filed: Mar. 8, 2016

(65) Prior Publication Data

US 2017/0262622 A1 Sep. 14, 2017

(51) Int. Cl.
  *G06F 21/32* (2013.01)
  *G06F 21/35* (2013.01)

(52) U.S. Cl.
  CPC .............. *G06F 21/35* (2013.01); *G06F 21/32* (2013.01)

(58) Field of Classification Search
  CPC .................................. G06F 21/35; G06F 21/32
  See application file for complete search history.

(56) References Cited

U.S. PATENT DOCUMENTS

| | | | | |
|---|---|---|---|---|
| 8,059,573 | B2 * | 11/2011 | Julian | H04W 4/21 370/312 |
| 8,908,894 | B2 | 12/2014 | Amento et al. | |
| 8,994,498 | B2 * | 3/2015 | Agrafioti | G06F 21/40 340/5.52 |
| 9,578,504 | B2 * | 2/2017 | Weast | H04W 12/06 |
| 9,641,222 | B2 * | 5/2017 | Yang | H04B 5/0031 |
| 9,763,097 | B2 * | 9/2017 | Robinson | H04W 12/08 |
| 2009/0249478 | A1 * | 10/2009 | Rosener | G06F 21/31 726/19 |
| 2013/0189925 | A1 * | 7/2013 | Staskawicz | H04B 7/24 455/41.1 |
| 2015/0163221 | A1 * | 6/2015 | Bolin | G07C 9/00309 726/7 |
| 2015/0242601 | A1 * | 8/2015 | Griffiths | G06F 21/305 726/5 |
| 2015/0264570 | A1 * | 9/2015 | Vaudenay | H04W 12/06 726/7 |
| 2016/0085960 | A1 * | 3/2016 | Priev | G06F 21/44 726/7 |
| 2016/0174071 | A1 * | 6/2016 | Weast | H04W 12/06 455/411 |

(Continued)

*Primary Examiner* — Saleh Najjar
*Assistant Examiner* — Louis C Teng
(74) *Attorney, Agent, or Firm* — Sage Patent Group

(57) ABSTRACT

A method performed by a processor of a first electronic device includes transmitting first authentication information through a Body Area Network (BAN) interface circuit that communicates with a second electronic device using electrical signals conducted through electrodes contacting a body of a user extending between the first and second electronic devices. Second authentication information is received through a radiofrequency transceiver circuit that communicates via an antenna through an air-interface with the second electronic device. A command to control an operation of the second electronic device is communicated responsive to determining that a combination of the first authentication information and the second authentication information satisfies an authentication rule.

20 Claims, 8 Drawing Sheets

(56) References Cited

U.S. PATENT DOCUMENTS

| | | | |
|---|---|---|---|
| 2016/0182496 A1* | 6/2016 | Weast | H04L 63/0853 |
| | | | 726/3 |
| 2016/0205094 A1* | 7/2016 | Harthattu | H04W 4/02 |
| | | | 455/411 |
| 2017/0223490 A1* | 8/2017 | Baker | H04W 4/008 |
| 2017/0325090 A1* | 11/2017 | Weast | H04B 13/005 |
| 2018/0115897 A1* | 4/2018 | Einberg | H04L 63/0853 |

* cited by examiner

PROVIDING MULTI-FACTOR SECURITY FOR ELECTRONIC DEVICES THROUGH BODY AREA NETWORK AND RADIOFREQUENCY NETWORK COMMUNICATIONS

BACKGROUND

The present disclosure relates to communications between electronic devices and more particularly to authenticating and performing other computer security operations on electronic devices.

There has been a rapid proliferation in the number and types of electronic devices that users access during their daily routine. Many users now routinely carry smart watches, fitness trackers, mobile phones, tablet computers, and other mobile electronic devices. User authentication is the primary security operation provided by these electronic devices, and typically requires a user to successfully complete an authentication operation to unlock a display screen upon device startup and after each instance of the device transitioning to a user operational state from a lower-power sleep state. For example, unlocking the display screen may require a user to manually enter a registered alphanumeric code/key or satisfy the analysis of a biometric sensor (e.g., a fingerprint sensor). Repetitively completing authentication on several devices being carried by a user can become inconvenient and detract from the user's experience with those devices. Consequently, some users disable device authentication operations one or more devices but thereby leave those device(s) susceptible to unauthorized use.

SUMMARY

Some embodiments of the present disclosure are directed to a method performed by a processor of a first electronic device. The method includes transmitting first authentication information through a Body Area Network (BAN) interface circuit that communicates with a second electronic device using electrical signals conducted through electrodes contacting a body of a user extending between the first and second electronic devices. Second authentication information is received through a radiofrequency transceiver circuit that communicates via an antenna through an air-interface with the second electronic device. A command to control an operation of the second electronic device is communicated responsive to determining that a combination of the first authentication information and the second authentication information satisfies an authentication rule. The command may correspond to an instruction for the second electronic device to unlock a display screen.

Some other embodiments of the present disclosure are directed to a method performed by a processor of a first electronic device, that includes transmitting first authentication information through a radiofrequency transceiver circuit communicating via an antenna through an air-interface with a second electronic device. Second authentication information through a BAN interface circuit that communicates with the second electronic device using electrical signals conducted through electrodes contacting a body of a user extending between the first and second electronic devices. A command to control an operation of the second electronic device is communicated responsive to determining that a combination of the first authentication information and the second authentication information satisfies an authentication rule.

Other methods, electronic devices, and computer program products according to embodiments of the inventive subject matter will be or become apparent to one with skill in the art upon review of the following drawings and detailed description. It is intended that all such additional methods, electronic devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to simplifying user authentication by enabling a user to complete an authentication operation on one electronic device to unlock or otherwise obtain access to operational functionality on another electronic device. Some related embodiments additionally or alternatively provide increased security by performing authentication of the electronic devices through a combination of communications carried out through a Body Area Network (BAN) and a radiofrequency network between the electronic devices. Various of these embodiments are now explained in the content of Figures 1a and 1b which are time sequential schematic illustrations of a wearable electronic device and another electronic device that perform security operations using communications through a BAN formed through a body of the user while contacting both electronic devices and through and a wireless air-interface between the electronic devices.

Figure 1A:
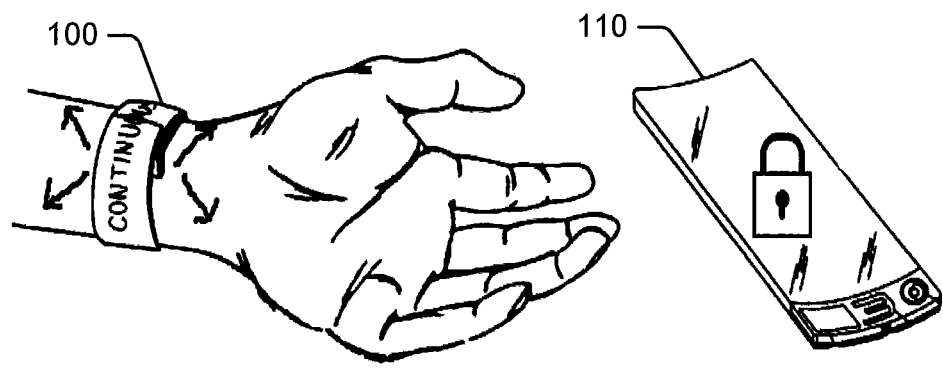
FIG. 1a and 1b are time sequential schematic illustrations of a wearable electronic device and another electronic device that perform security operations using communications through the body of a human user and a wireless air-interface, according to some embodiments of the present disclosure.

Referring to FIG. 1a, the user is wearing a first electronic device 100, which may be a smart watch, fitness tracker, or other type of electronic device. A second electronic device 110 may be a cellular phone, tablet computer, or other portable or non-portable electronic device. Each of the electronic devices 100 and 110 includes a BAN interface circuit that communicates using electrical signals conducted through electrodes contacting the user's body, and a radiofrequency transceiver circuit that communicates via an antenna through an air-interface that is separate (outside of) from the user's body. The electronic devices 100 and 110 are configured to perform user authentication through a combination of communications through the BAN interface circuits and the radiofrequency transceiver circuits.

In FIG. 1a the user has successfully completed an authentication security operation through the first electronic device 100, e.g., by entering a security code/key or completing biometric authentication, to unlock a display screen thereof and/or unlock operational functionality, such as a user application, processed by the first electronic device 100. The second electronic device 110 has a locked display screen which can be unlocked by a user entering a correct code/key through a user interface of the second electronic device 110 or successfully completing bio-authentication through a biometric sensor, such as a fingerprint scanner, of the second electronic device 110.

In FIG. 1a, the user is not touching the second electronic device 110, so no BAN link has been established between the BAN interface circuits of the electronic devices 100 and 110. However, the electronic device 100 and 110 may communicate through an air-interface using their radiofrequency transceiver circuits, which may operate according to the Bluetooth, WiFi direct, Near-Field Communication (NFC), Radio-Frequency Identification (RFID), or another radio communication protocol.

Figure 1B:
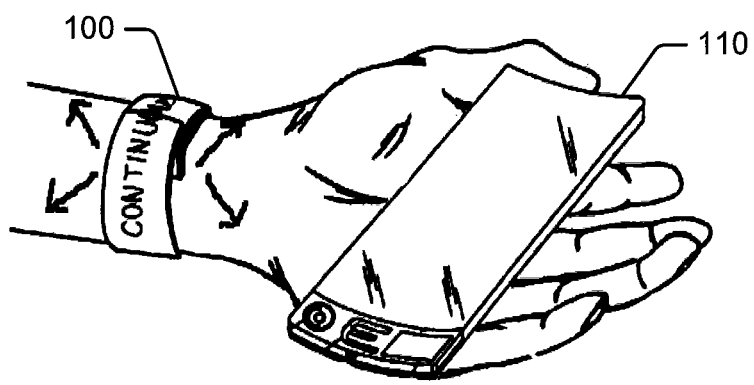

Referring to FIG. 1b, the user has picked-up and is holding the second electronic device 110 so that electrodes of the BAN interface circuit electrically contact the user's hand. A BAN link can now be established through the user's hand and wrist extending between the electronic devices 100 and 110. In accordance with some embodiments herein, the first electronic device 100 can unlock and/or control other operational functions of the second electronic device 110 using a combination of communications through a BAN link and a RF communication link between the first and second electronic devices 100 and 110.

In some further embodiments the display screen or defined operational functionality of the second electronic device 110 remains unlocked based on the first and second electronic devices 100 and 110 maintaining continued communication connectivity through the BAN link. The first electronic device 100 may be configured to respond to detecting that the second electron device 110 is no longer communicatively connected through the BAN link, by communicating another command to the second electronic device 110 to lock its display screen and/or disable one or more operational functions being executed by the second electronic device 110. In some further embodiments, the establishment of the BAN link and/or the radiofrequency communication link can be controlled based on result of the attempted exchange of the authentication information.

Figure 2:
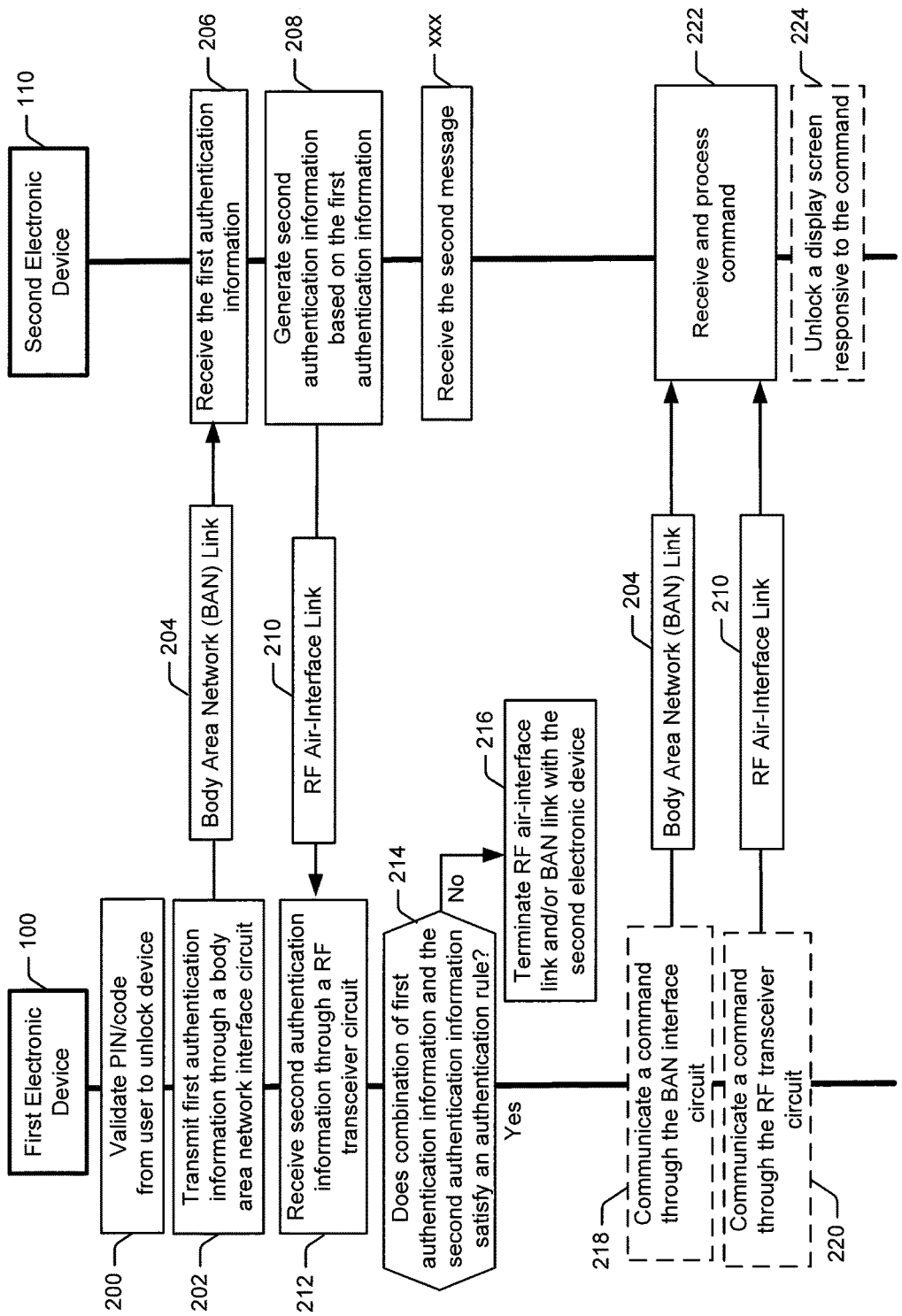
FIG. 2 is a combined flowchart and data flow diagram that illustrates operations performed by a pair of electronic devices to authenticate each other and provide responsive control, according to some embodiments of the present disclosure.

FIG. 2 is a combined flowchart and data flow diagram that illustrates operations performed by the electronic devices 100 and 110 to authenticate each other and provide responsive control, according to some embodiments of the present disclosure. Referring to FIG. 2, the first electronic device 100 validates (block 200) a PIN or code received from the user through a user interface to unlock the first electronic device 100. The first electronic device 100 transmits (block 202) first authentication information through the BAN interface circuit that communicates with the second electronic device 110 using electrical signals conducted through electrodes contacting the user's body and a BAN link 204 through the body extending between the first and second electronic devices 100 and 110.

The second electronic device 110 receives (block 206) the first authentication information, and generates (block 208) second authentication information based on the first authentication information. The first authentication information may be based on or correspond to a PIN or code entered by the user to unlock a display screen and/or access an application (operational functionality) provided by the first electronic device 100, and the second authentication information may be based on or correspond to a PIN or code that has been entered by the user or registered in a memory of the second electronic device 110 for unlocking a display screen and/or accessing an application (operational functionality) provided by the second electronic device 110. Other examples of first authentication information and second authentication information are explained in further detail below with regard to, for example, FIGS. 3-5.

The second electronic device 110 communicates the second authentication information through its radiofrequency transceiver circuit and the radiofrequency air interface link 210. The first electronic device 100 receives (block 212) the second authentication information through its radiofrequency transceiver circuit. The first electronic device 100 determines (block 214) whether a combination of the first authentication information and the second authentication information satisfies an authentication rule, and if not, terminates the radiofrequency inter-interface link to 10 and/or terminates the BAN link 204 with the second electronic device 110.

In contrast, when the combination of the first and second authentication information is determined (block 214) to satisfy the authentication rule, the first electronic device 100 communicates a command to control an operation of the second electronic device 110. The first electronic device 100 may communicate (block 218) the command through the BAN interface circuit and the BAN link 204 and/or may communicate (block 220) the command through the radiofrequency transceiver circuit and the radiofrequency air-interface link 210. The second electronic device 110 receives and processes (block 222) the command, and controls its operation responsive to the command. In one embodiment, the second electronic device 110 unlocks (block 224) its display screen responsive to the command.

Figure 3:
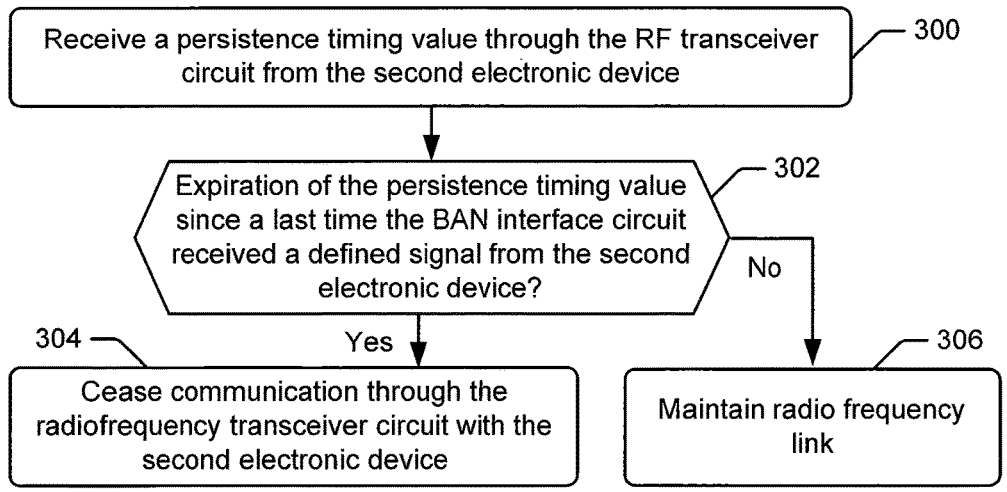
FIGS. 3-5 are flowcharts that illustrate further operations performed by an electronic device to control communications with another electronic device in accordance with some embodiments of the present disclosure.

In some further embodiments, the first electronic device 100 detects failure of its BAN interface circuit to continue to communicate with the second electronic device 110 through the BAN link formed through the user's body, and responds to detecting the failure by ceasing communication through its radiofrequency transceiver circuit with the second electronic device 110. The communication failure may correspond to the user having released the second electronic device 110, such as by putting it down on a table surface. FIG. 3 is a flowchart that illustrates related operations that may be performed by the first electronic device 100 to control communications with the second electronic device 110 in accordance with some embodiments of the present disclosure.

Referring to FIG. 3, the first electronic device 100 receives (block 300) a persistence timing value through its radiofrequency transceiver circuit, such as when receiving (block 212 of FIG. 2) the second authentication information. The first electronic device 100 may detect failure of the BAN interface circuit based on determining (block 302) whether the persistence timing value has expired since a last time the BAN interface circuit received a defined signal from the second electronic device 110. Responsive to determining that the persistence timing value has expired, the first electronic device 100 ceases (block 304) communication through its radiarcquency transceiver circuit with the second electronic device 110. In contrast, responsive to determining that the persistence timing value has not expired, the first electronic device 100 performs operations to maintain (block 306) the radiofrequency link through its radiofrequency transceiver circuit.

Figure 4:
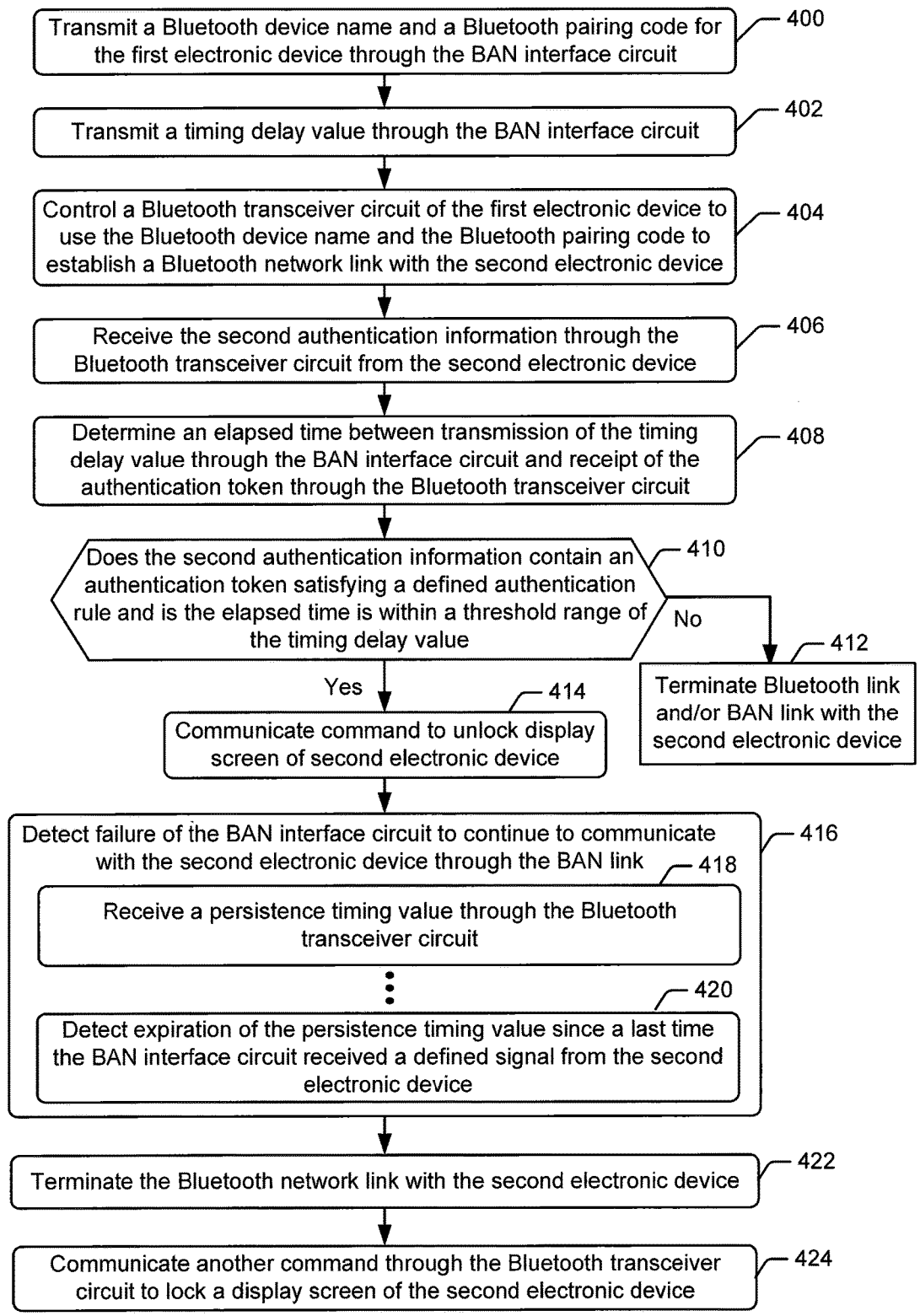

FIG. 4 is a flowchart that illustrates further operations that may be performed by the first electronic device 100 to control communications with the second electronic device 110, such as to control pairing of a Bluetooth communication link and/or maintenance of the Bluetooth communication link between the first and second electronic devices 110.

Referring to FIG. 4, to transmit (block 202 of FIG. 2) the first authentication information, the first electronic device 100 can transmit (block 400) a Bluetooth device name and a Bluetooth pairing code for the first electronic device 100 through the BAN interface circuit. The first electronic device 100 controls (block 404) a Bluetooth transceiver circuit of the first electronic device 100 to use the Bluetooth device name and the Bluetooth pairing code to establish a Bluetooth network link with the second electronic device 110. The first electronic device 100 can receive (block 406) the second authentication information through the Bluetooth transceiver circuit and the Bluetooth network link from the second electronic device 110. The first electronic device 100 can determine (block 410) whether the second authentication information contains an authentication token that satisfies a defined authentication rule and was received through the Bluetooth transceiver circuit.

In a further embodiment, the first electronic device 100 transmits (block 402) a timing delay value through the BAN interface circuit, and subsequently determines (block 408) an elapsed time between the transmission of the timing delay value through the BAN interface circuit and the receipt (block 406) of the authentication token through the Bluetooth transceiver circuit. The determination of block 410 can be further based on whether the elapsed time is within a threshold range of the timing delay value. Accordingly, the determination of block 410 depends upon the second authentication information received through the Bluetooth transceiver circuit from second electronic device 110, and whether the second authentication information was received within a threshold range of a timing delay value that was provided to the second electronic device 110 through the BAN link. The second electronic device 110 can control its timing of transmission of the second authentication information based on the received timing delay value.

Responsive to the determination of block 410 being satisfied, the first electronic device 100 communicates (block 414) a command to unlock the display screen of the second electronic device 110. In contrast, responsive to the determination of block 410 not being satisfied, the first electronic device 100 terminates (block 412) the Bluetooth link and/or the BAN link with the second electronic device 110. The first electronic device 100 may additionally or alternatively respond to the determination of block 410 not being satisfied by communicating (block 424) another command through the Bluetooth transceiver circuit to lock a display screen of the second electronic device 110.

The first and second electronic devices 100 and 110 can be configured to determine whether the BAN link remains present, e.g., alive, between the first and second electronic devices 100 and 110 and, if not, can responsively terminate the Bluetooth link or other radiofrequency link earlier established between the first and second electronic devices 100 and 110. In the embodiment of FIG. 4, the first electronic device 100 detects (block 416) failure of the BAN interface circuit to continue to communicate with the second electronic device 110 through the BAN link and, responsive to detecting the failure, flushes (block 422) Bluetooth connection parameters of the Bluetooth network link from memory of the first electronic device 100 to permanently terminate the Bluetooth network link with the second electronic device 110.

The first electronic device 100 may be configured, when receiving (block 212 of FIG. 2) the second authentication information, to receive (block 418) a persistence timing value through the Bluetooth transceiver circuit. Failure of the BAN interface circuit to continue to communicate with the second electronic device 110 through the BAN link, can be determined based on detecting (block 420) expiration of the persistence timing value since a last time the BAN interface circuit received a defined signal from the second electronic device 110.

The first electronic device 100 may alternatively or additionally be configured to respond to detecting failure of the BAN interface circuit to continue to communicate with the second electronic device 110 through the BAN link by communicating (block 424) another command through the Bluetooth transceiver circuit to lock a display screen of the second electronic device 110. The second electronic device 110 may autonomously lock its display screen responsive to detecting that failure of the BAN link to the first electronic device 100.

In some embodiments, the first electronic device 100 is configured to monitor persistence of its connected to the user's body, e.g., through impedance measurements through contacts of the BAN transceiver and/or through infrared light reflections from a surface of the body. The first electronic device 100 can respond to detecting failure of the persistent connection, e.g., from the user removing the device 100, by communicating a command through the Bluetooth transceiver circuit to lock a display screen of the second electronic device 110, by locking a display device of the first electronic device 100, and/or by flushing Bluetooth connection parameters of the Bluetooth network link from memory of the first electronic device 100 and/or flushing BAN connection parameters of the BAN link from memory of the first electronic device 100.

In some further embodiments, the first electronic device 100 selects between maintaining and ceasing the radiofrequency link and/or the BAN link based on repeated measurements of a round-trip delay of signals communicated through the BAN link with the second electronic device 110. These operations can enable the first electronic device 100 to effectively measure physical distance through the user's body connecting the first and second electronic devices 100 and 110, and operationally select between maintaining and ceasing the radiofrequency link and/or the BAN link based on measured changes in the physical distance. Thus, for example, the first electronic device 100 may respond to a threshold increase or decrease of the measured distance caused by the second electronic device 110 being moved between the user's hands or moved from the user's hand to another person's hand who is maintaining conductive contact in some manner to the user's body.

Figure 5:
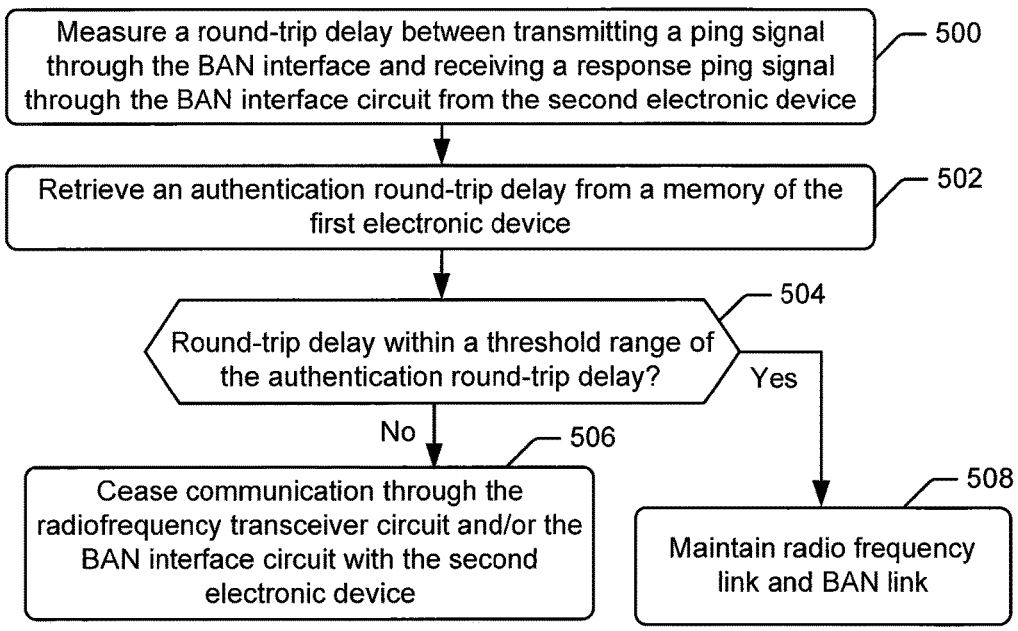

Referring to FIG. 5, the first electronic device 100 measures (block 500) a round-trip delay between transmitting a ping signal through its BAN interface circuit toward the second electronic device 110 and receiving a response ping signal through its BAN interface circuit from the second electronic device 110. The first electronic device 100 retrieves (block 502) an authentication round-trip delay from a memory the first electronic device 100, where the authentication round-trip delay may have been measured and stored in the memory during earlier operations to initially unlock the screen of the second electronic device 110. The first electronic device 100 determines (block 504) whether the round-trip delay is within a threshold range of the authentication round-trip delay. When the round-trip delay is within a threshold range of the authentication round-trip delay, the first electronic device 100 maintains (block 508) that radiofrequency link in the BAN link. In contrast, when the round-trip delay is not within the threshold range of the authentication round-trip delay, the first electronic device 100 ceases (block 506) communication through the radiofrequency transceiver circuit and/or ceases communication through the BAN interface circuit with the second electron device 110.

Although various embodiments of the described in the context of FIG. 2 where the first authentication information is communicated through the BAN link and the second authentication information is communicated through the radiofrequency link, in some other embodiments the operations can be reversed or the information can be communicated through other communication links.

Figure 6:
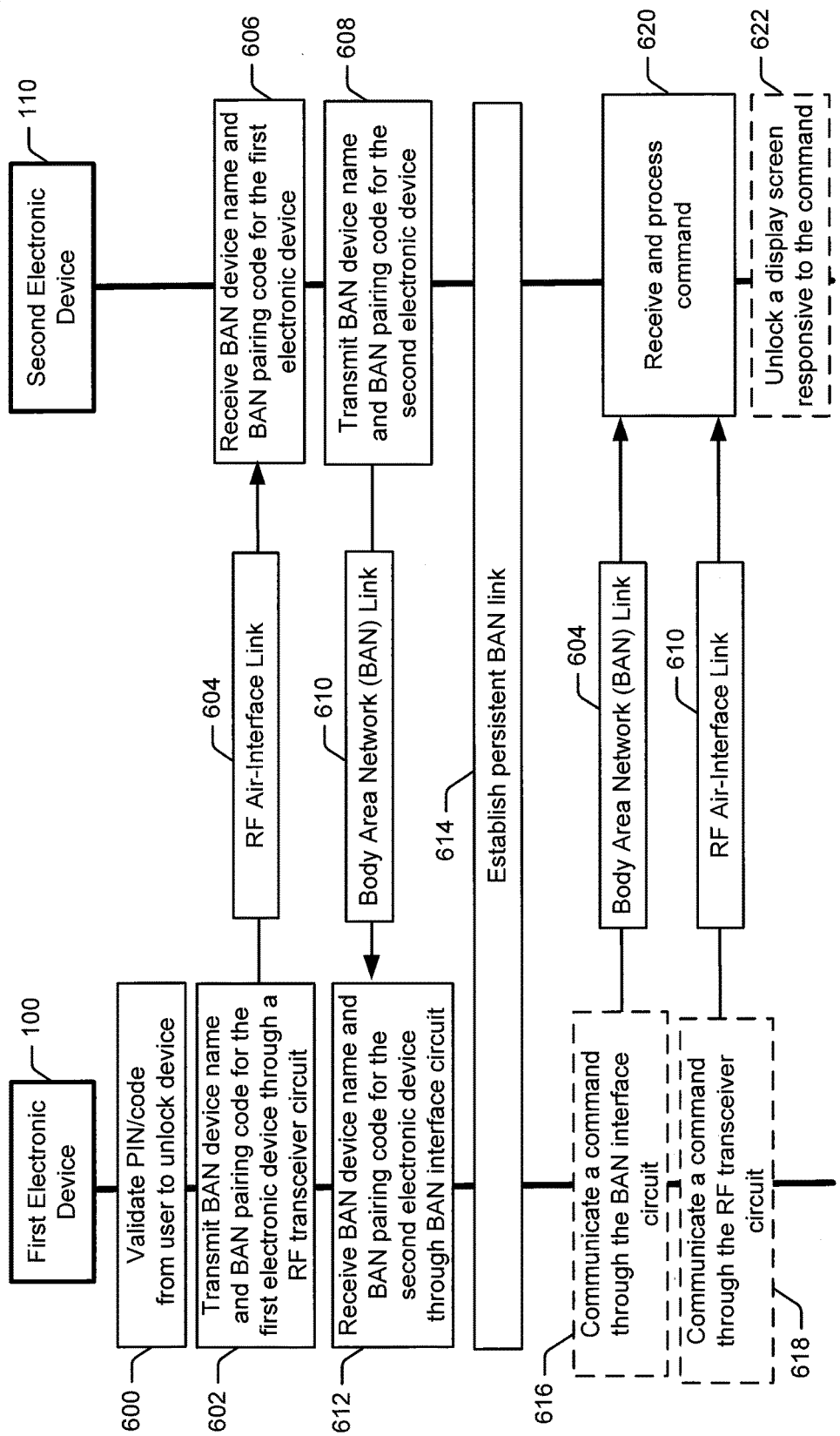
FIG. 6 is a combined flowchart and data flow diagram that illustrates other operations performed by a pair of electronic devices to authenticate each other and provide responsive control, according to some other embodiments of the present disclosure.

FIG. 6 is a combined flowchart and data flow diagram that illustrates other operations performed by the first and second electronic devices 100 and 110 to authenticate each other and provide responsive control, according to some other embodiments of the present disclosure. Referring to FIG. 6, the first electronic device 100 validates (block 600) a PIN or code received from the user through a user interface to unlock the first electronic device 100. The first electronic device 100 transmits first authentication information through a radiofrequency transceiver circuit which communicates via an antenna through an air-interface with the second electronic device 110. In the embodiment of FIG. 6, the first electronic device 100 transmits (block 602) a BAN device name and a BAN pairing code for the first electronic device 100 through the radiofrequency transceiver circuit and a radiofrequency link 604 to the second electronic device 110. The second electronic device 110 receives (block 606) the BAN device name and the BAN pairing code and, based, thereon, and generates and transmits (block 608) a BAN device name and a BAN pairing code for the second electronic device 110 through its BAN interface circuit and the BAN link 610 extending through the user's body to the first electronic device 100.

The first electronic device 100 receives second authentication information through the BAN interface circuit and the BAN link from the second electronic device 110. In the embodiment of FIG. 6, the first electronic device 100 receives (block 612) the BAN device name and a BAN pairing code for the second electronic device 110 through its BAN interface circuit. The first electronic device 100 establishes (block 614) a persistent BAN link using the BAN device name and a BAN pairing code for the second electronic device 110. The first electronic device 100 may control its BAN interface circuit using the BAN device name and the BAN pairing code of the second electronic device 110 to determine, e.g, lookup in a table or compute, BAN link setup information from the second electronic device 110, which the first electronic device 100 needed to establish the persistent BAN link. Establishment and maintenance of the persistent BAN link can include performing bilateral authentication of the first and second electronic devices 100 and 110 to determine whether the persistent BAN link is allowed to be established and/or maintained, and/or generating encryption keys used to encrypt data for transmission and decrypt data that is received through the persistent BAN link.

When the persistent BAN link has been established, the first electronic device 100 communicates a command to control an operation of the second electronic device 110. The first electronic device 100 may communicate (block 616) the command through the BAN interface circuit and the BAN link 604 and/or may communicate (block 618) the command through the radiofrequency transceiver circuit and the radiofrequency air-interface link 610. The second electronic device 110 receives and processes (block 620) the command, and controls its operation responsive to the command. In one embodiment, the second electronic device 110 unlocks (block 622) its display screen responsive to the command.

Figure 7:
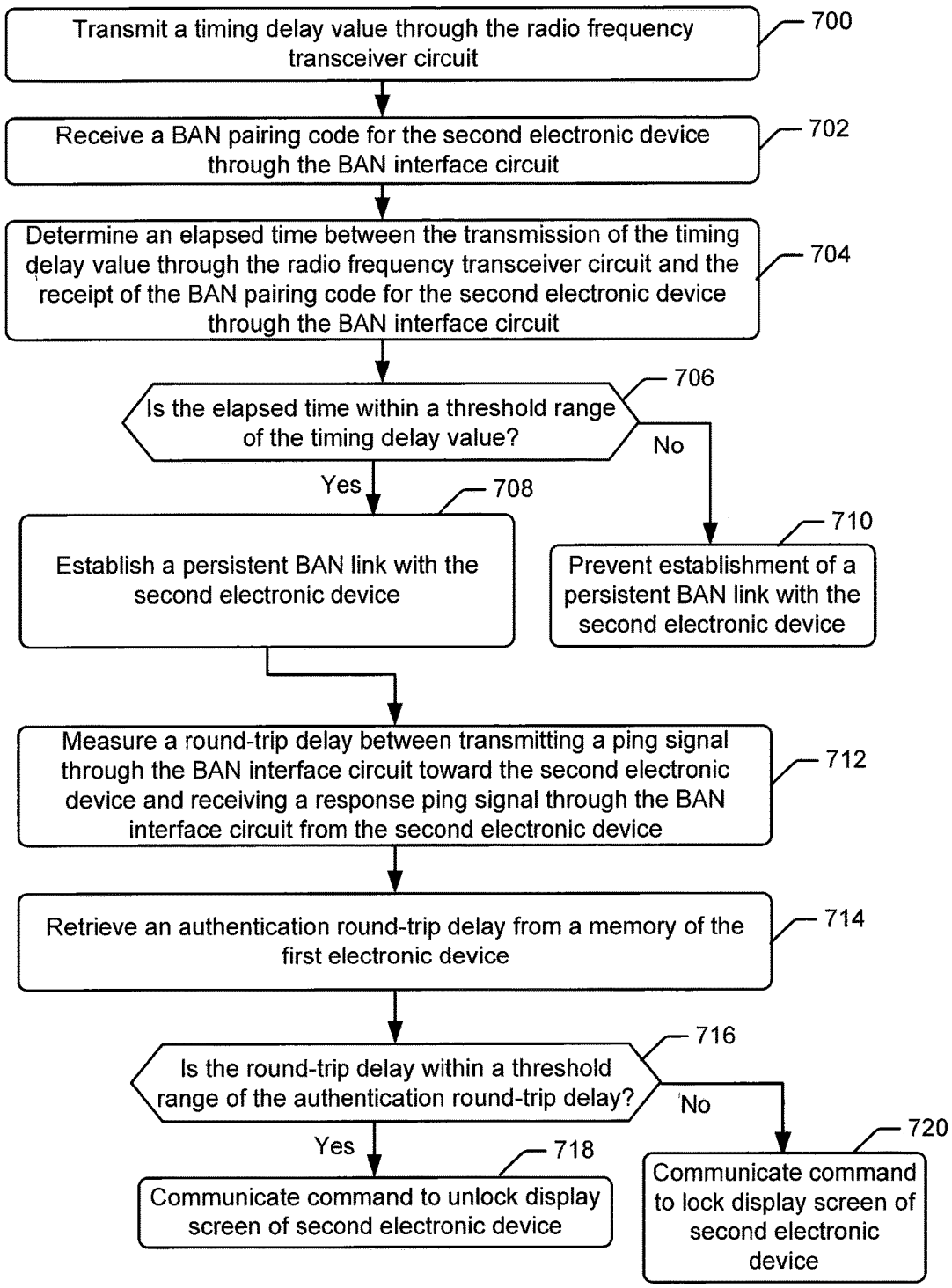
FIGS. 7-8 are flowcharts that illustrate further operations performed by an electronic device to control communications with another electronic device in accordance with some other embodiments of the present disclosure.

Further operations that may be performed by the first electronic device 100 are illustrated in the flowchart of FIG. 7. Referring to FIG. 7, the first electronic device 100 transmits (block 700) a timing delay value through the radiofrequency transceiver circuit as part of the first authentication information. The first electronic device 100 receives (block 702) a BAN pairing code for the second electronic device 110 through the BAN interface circuit, and determines (block 704) an elapsed time between the transmission of the timing delay value through the radiofrequency transceiver circuit and the receipt of the BAN pairing code for the second electronic device 110 through the BAN interface circuit. The first electronic device 100 determines (block 706) whether the elapsed time is within a threshold range of the timing delay value and, if not, prevents (block 710) establishment a persistent BAN link with the second electronic device 110. In contrast, when the elapsed time is determined (block 706) to be within the threshold range of the timing delay value, the first electronic device establishes (block 708) the persistent BAN link with the second electronic device 110.

In some further embodiments, the first electronic device 100 repeatedly selects between locking and unlocking a display screen of the second electronic device 110 based on measurements of a round-trip delay of signals communicated through the BAN link with the second electronic device 110. These operations can enable the first electronic device 100 to effectively measure physical distance through the user's body connecting the first and second electronic devices 100 and 110, and control locking and unlocking of the display screen of the second electronic device 110 based on measured changes in the physical distance. Thus, for example, the first electronic device 100 may respond to a threshold increase or decrease of the measured distance caused by the second electronic device 110 being moved between the user's hands or moved from the user's hand to another person's hand who is maintaining conductive contact in some manner to the user's body.

In the embodiment of FIG. 7, the first electronic device 100 measures (block 712) a round-trip delay between transmitting a ping signal through its BAN interface circuit toward the second electronic device 110 and receiving a response ping signal through its BAN interface circuit from the second electronic device 110. The first electronic device 100 retrieves (block 714) an authentication round-trip delay from a memory the first electronic device 100, where the authentication round-trip delay may have been measured and stored in the memory during earlier operations to initially unlock the screen of the second electronic device 110. The first electronic device 100 determines (block 716) whether the round-trip delay is within a threshold range of the authentication round-trip delay. When the round-trip delay is within a threshold range of the authentication round-trip delay, the first electronic device 100 communicates (block 718) a command to unlock or maintain unlocked the display screen of the second electronic device 110. In contrast, when the round-trip delay is not within the threshold range of the authentication round-trip delay, the first electronic device 100 communicates (block 720) a command to lock or maintain locked the display screen of the second electronic device 110.

The first and second electronic devices 100 and 110 can be configured to determine whether the BAN link remains present, e.g., alive, between the first and second electronic devices 100 and 110 and, if not, can responsively terminate the Bluetooth link or other radiofrequency link earlier established between the first and second electronic devices 100 and 110. These and related operations are illustrated in the flowchart of FIG. 8.

Figure 8:
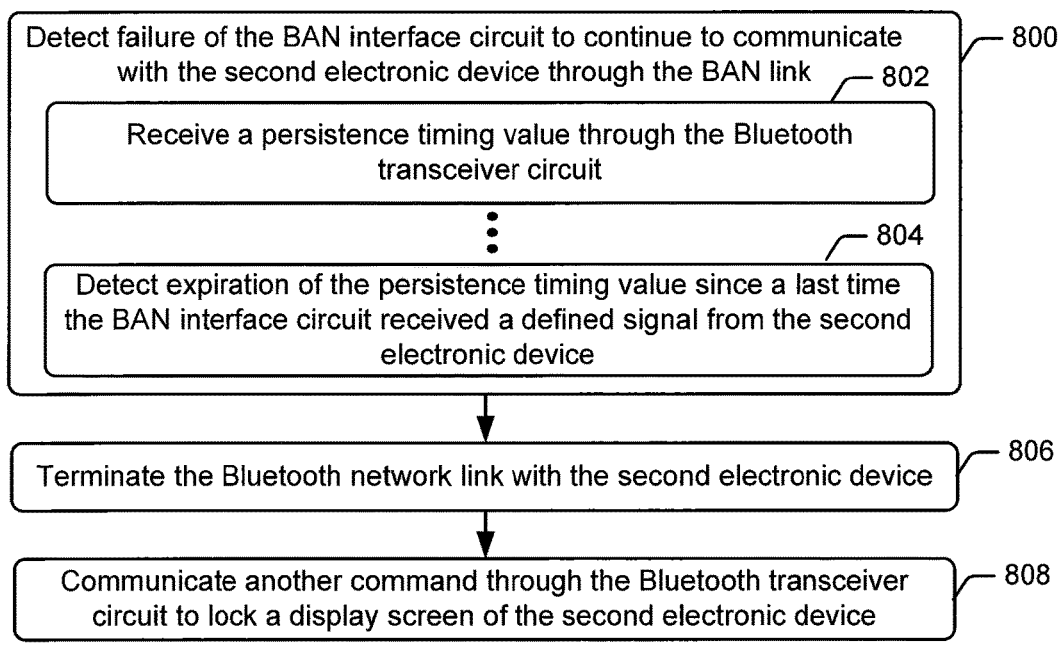

Referring to FIG. 8, the first electronic device 100 detects (block 800) failure of the BAN interface circuit to continue to communicate with the second electronic device 110 through the BAN link and, responsive to detecting the failure, flushes Bluetooth connection parameters of the Bluetooth network link from memory of the first electronic device 100 to permanently terminate (block 806) the Bluetooth network link with the second electronic device 110. The first electronic device 100 may additionally or alternatively respond to detecting failure of the BAN link by flushing BAN connection parameters used by the BAN interface circuit to maintain the BAN link, from memory of the first electronic device 100 to permanently terminate the BAN link with the second electronic device 110.

The first electronic device 100 may be configured, when receiving (block 612 of FIG. 6) the second authentication information, to receive (block 802) a persistence timing value through the Bluetooth transceiver circuit. Failure of the BAN interface circuit to continue to communicate with the second electronic device 110 through the BAN link, can be determined based on detecting (block 804) expiration of the persistence timing value since a last time the BAN interface circuit received a defined signal from the second electronic device 110.

The first electronic device 100 may alternatively or additionally be configured to respond to detecting failure of the BAN interface circuit to continue to communicate with the second electronic device 110 through the BAN link by communicating (block 808) another command through the Bluetooth transceiver circuit to lock a display screen of the second electronic device 110.

Figure 9:
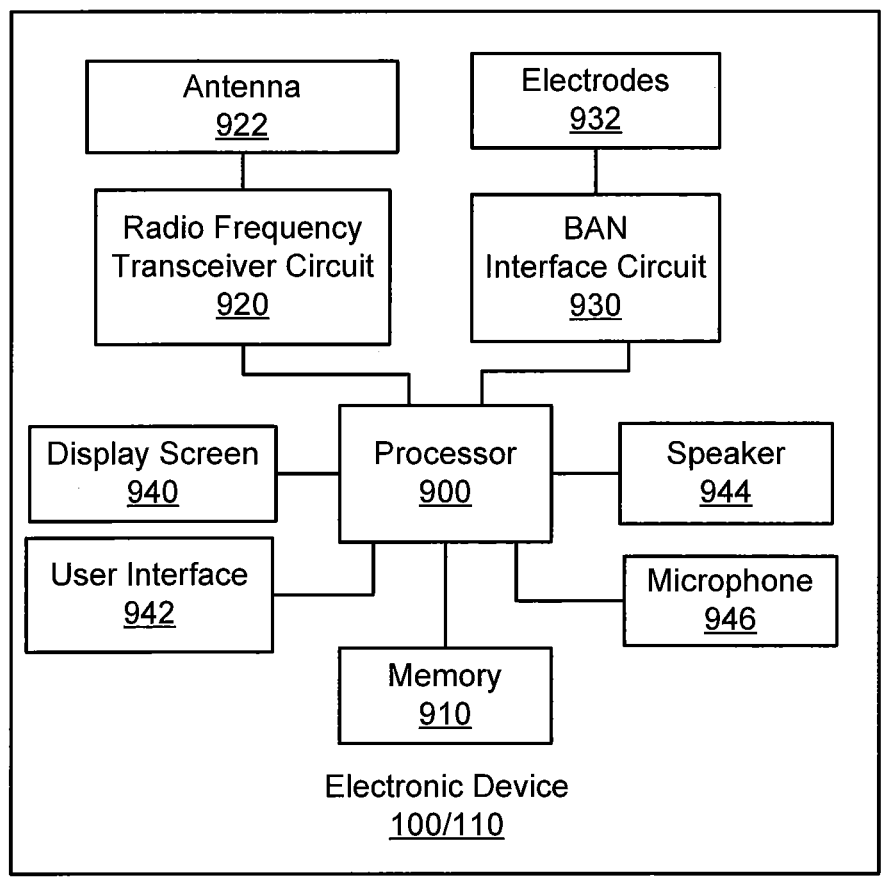
FIG. 9 illustrates a block diagram of an electronic device that is configured according to some embodiments of the present disclosure.

FIG. 9 illustrates a block diagram of an electronic device, which may correspond to the first electronic device 110 and/or the second electronic device 110, which is configured according to some embodiments of the present disclosure. Referring to FIG. 9, the electronic device includes a processor 900, a memory 910, a radiofrequency transceiver circuit 920, and a BAN interface circuit 930. The radiofrequency transceiver circuit 920 communicates radiofrequency signals via an antenna 922 through an air-interface with another electronic device. The radiofrequency transceiver circuit 920 may operate according to the Bluetooth, WiFi direct, Near-Field Communication (NFC), Radio-Frequency Identification (RFID), or another radio communication protocol.

The BAN interface circuit 930 communicates with another electronic device using electrical signals conducted through electrodes 932 contacting a body of a user extending between the electronic devices. The body of the user provides the transmission medium along the length of a limb of the body for communications between the electronic devices. In particular, conductive fluid, tissues (e.g., blood vessels, internal tissue, skin, etc.) in/of the body of the user may be used as a communications channel. The BAN interface circuit 930 may be configured to communicate through the electrodes 932 using carrier frequencies between about 10.0 Megahertz (MHz) and about 40.0 MHz to transmit signals through the body of the user. For example, BAN signals at about a 26.0 MHz carrier frequency may provide a well-controlled communication link in a channel provided by the body of the user, with minimal or no signal radiation from the body.

The electronic device may further include a display screen 940, a user interface 942 (e.g., keyboard, touch screen input interface, etc.), a speaker 944, and a microphone 946. The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 1070, described below as a non-transitory computer readable medium, to perform at least some of the operations described herein as being performed by an electronic device.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms first, second, etc. may be used herein to describe various messages, operations, and/or components, these messages, operations, and/or components should not be limited by these terms. These terms are only used to distinguish one message, operation, and/or component from another message, operation, and/or component. Thus, a first message, operation, and/or component discussed herein could be termed a second message, operation, and/or component without departing from the teachings of the present disclosure.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing by a processor of a first electronic device:
transmitting first authentication information through a Body Area Network (BAN) interface circuit that communicates with a second electronic device using electrical signals conducted through electrodes contacting a body of a user extending between the first and second electronic devices;
receiving second authentication information that is generated by the second electronic device based on the first authentication information through a radiofrequency transceiver circuit that communicates via an antenna through an air-interface with the second electronic device;
determining, based on the first authentication information and the second authentication information, that the first authentication information and the second authentication information satisfies an authentication rule, wherein the determining comprises determining that the second authentication information was generated based on the first authentication information; and
communicating a command to control an operation of the second electronic device responsive to determining that a combination of the first authentication information and the second authentication information satisfies the authentication rule.

2. The method of claim 1, wherein the communicating the command to control the operation of the second electronic device responsive to determining that the combination of the first authentication information and the second authentication information satisfies the authentication rule, comprises:
transmitting a command through the radiofrequency transceiver circuit to unlock a display screen of the second electronic device.

3. The method of claim 1, further comprising:
detecting failure of the BAN interface circuit to continue to communicate with the second electronic device through the body of the user; and
responsive to detecting the failure, ceasing communication through the radiofrequency transceiver circuit with the second electronic device.

4. The method of claim 3, wherein:
the receiving the second authentication information through the radiofrequency transceiver circuit comprises:
receiving a persistence timing value through the radiofrequency transceiver circuit; and the detecting failure of the BAN interface circuit to continue to communicate with the second electronic device through the body of the user, comprises:
detecting expiration of the persistence timing value since a last time the BAN interface circuit received a defined signal from the second electronic device.

5. The method of claim 1, wherein:
the transmitting the first authentication information through the BAN interface circuit, comprises:
transmitting a Bluetooth device name and a Bluetooth pairing code for the first electronic device through the BAN interface circuit; and
the receiving the second authentication information through the radiofrequency transceiver circuit, comprises:
controlling a Bluetooth transceiver circuit of the first electronic device to use the Bluetooth device name and the Bluetooth pairing code to establish a Bluetooth network link with the second electronic device; and
receiving the second authentication information through the Bluetooth transceiver circuit and the Bluetooth network link from the second electronic device; and
the determining that the combination of the first authentication information and the second authentication information satisfies the authentication rule, comprises
determining that the second authentication information contains an authentication token that satisfies a defined authentication rule and that the authentication token was received through the Bluetooth transceiver circuit.

6. The method of claim 5, wherein:
the transmitting the first authentication information through the BAN interface circuit, further comprises:
transmitting a timing delay value through the BAN interface circuit; and
the determining that the combination of the first authentication information and the second authentication information satisfies the authentication rule, further comprises
determining an elapsed time between the transmission of the timing delay value through the BAN interface circuit and the receipt of the authentication token through the Bluetooth transceiver circuit; and
determining whether the elapsed time is within a threshold range of the timing delay value.

7. The method of claim 5, further comprising:
detecting failure of the BAN interface circuit to continue to communicate with the second electronic device through the body of the user; and
responsive to detecting the failure, flushing Bluetooth connection parameters of the Bluetooth network link from memory of the first electronic device to permanently terminate the Bluetooth network link with the second electronic device.

8. The method of claim 7, wherein:
the receiving the second authentication information through the Bluetooth transceiver circuit and the Bluetooth network link from the second electronic device comprises:
receiving a persistence timing value through the Bluetooth transceiver circuit; and
the detecting failure of the BAN interface circuit to continue to communicate with the second electronic device through the body of the user, comprises:

detecting expiration of the persistence timing value since a last time the BAN interface circuit received a defined signal from the second electronic device.

9. The method of claim 5, further comprising:
detecting failure of the BAN interface circuit to continue to communicate with the second electronic device through the body of the user; and
responsive to detecting the failure, communicating another command through the Bluetooth transceiver circuit to lock a display screen of the second electronic device.

10. The method of claim 1, wherein:
one of the first and second electronic devices comprises a mobile telephone; and
the other one of the first and second electronic devices comprises a wearable electronic device configured to be worn on an arm of the user.

11. The method of claim 1, further comprising:
measuring a round-trip delay between transmitting a ping signal through the BAN interface circuit toward the second electronic device and receiving a response ping signal through the BAN interface circuit from the second electronic device,
wherein the communicating the command to control the operation of the second electronic device responsive to determining that the combination of the first authentication information and the second authentication information satisfies an authentication rule, comprises:
retrieving an authentication round-trip delay from a memory of the first electronic device; and
determining whether the round-trip delay is within a threshold range of the authentication round-trip delay.

12. A method, comprising:
performing by a processor of a first electronic device:
transmitting first authentication information through a radiofrequency transceiver circuit communicating via an antenna through an air-interface with a second electronic device;
receiving second authentication information that is generated by the second electronic device based on the first authentication information through a Body Area Network (BAN) interface circuit that communicates with the second electronic device using electrical signals conducted through electrodes contacting a body of a user extending between the first and second electronic devices;
determining, based on the first authentication information and the second authentication information, that the first authentication information and the second authentication information satisfies an authentication rule, wherein the determining comprises determining that the second authentication information was generated based on the first authentication information; and
communicating a command to control an operation of the second electronic device responsive to determining that a combination of the first authentication information and the second authentication information satisfies the authentication rule.

13. The method of claim 12, wherein the communicating the command to control the operation of the second electronic device responsive to determining that the combination of the first authentication information and the second authentication information satisfies the authentication rule, comprises:
transmitting a command through the BAN interface circuit to unlock a display screen of the second electronic device.

14. The method of claim 12, wherein:
the transmitting first authentication information through the radiofrequency transceiver circuit, comprises:
transmitting a BAN device name and a BAN pairing code for the first electronic device through the radiofrequency transceiver circuit; and
the receiving second authentication information through the BAN interface circuit, comprises:
controlling the BAN interface circuit of the first electronic device using a BAN device name and a BAN pairing code of the second electronic device to determine BAN link setup information needed to establish a persistent BAN link.

15. The method of claim 14, wherein:
the transmitting first authentication information through the radiofrequency transceiver circuit, further comprises:
transmitting a timing delay value through the radiofrequency transceiver circuit; and
the receiving second authentication information through the BAN interface circuit, further comprises
receiving a BAN pairing code for the second electronic device through the BAN interface circuit;
determining an elapsed time between the transmission of the timing delay value through the radiofrequency transceiver circuit and the receipt of the BAN pairing code for the second electronic device through the BAN interface circuit; and
selecting establishing the persistent BAN link with the second electronic device responsive to whether the elapsed time is within a threshold range of the timing delay value.

16. The method of claim 14, further comprising:
detecting failure of the BAN interface circuit to continue to communicate with the second electronic device through the body of the user; and
responsive to detecting the failure, ceasing communication through the radiofrequency transceiver circuit with the second electronic device.

17. The method of claim 16, further comprising:
responsive to detecting the failure, flushing Bluetooth connection parameters used by the radiofrequency transceiver circuit to maintain a Bluetooth link, from memory of the first electronic device to permanently terminate the Bluetooth link with the second electronic device.

18. The method of claim 16, further comprising:
responsive to detecting the failure, flushing BAN connection parameters used by the BAN interface circuit to maintain the BAN link, from memory of the first electronic device to permanently terminate the BAN link with the second electronic device.

19. The method of claim 16, wherein:
the receiving second authentication information through the radiofrequency transceiver circuit, comprises:
receiving a persistence timing value through the radiofrequency transceiver circuit; and
the detecting failure of the BAN interface circuit to continue to communicate with the second electronic device through the body of the user, comprises:
detecting expiration of the persistence timing value since a last time the BAN interface circuit received a defined signal from the second electronic device.

20. The method of claim 12, further comprising:
measuring a round-trip delay between transmitting a ping signal through the BAN interface circuit toward the second electronic device and receiving a response ping signal through the BAN interface circuit from the second electronic device,
wherein the communicating the command to control the operation of the second electronic device responsive to determining that the combination of the first authentication information and the second authentication information satisfies an authentication rule, comprises:
retrieving an authentication round-trip delay from a memory of the first electronic device; and
determining whether the round-trip delay is within a threshold range of the authentication round-trip delay.

* * * * *